(12) United States Patent
Poublan et al.

(10) Patent No.: US 8,499,106 B2
(45) Date of Patent: Jul. 30, 2013

(54) BUFFERING OF A DATA STREAM

(75) Inventors: Serge Henri Poublan, Saffron Walden (GB); Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 61 days.

(21) Appl. No.: 12/801,784

(22) Filed: Jun. 24, 2010

(65) Prior Publication Data

US 2011/0320651 A1 Dec. 29, 2011

(51) Int. Cl.
*G06F 3/00* (2006.01)
*G06F 5/00* (2006.01)

(52) U.S. Cl.
USPC .................... 710/57; 710/52; 710/53; 710/56

(58) Field of Classification Search
USPC ........................................................ 710/53
See application file for complete search history.

(56) References Cited

U.S. PATENT DOCUMENTS

| | | | | |
|---|---|---|---|---|
| 4,022,097 A | * | 5/1977 | Strangio | 84/635 |
| 6,535,484 B1 | * | 3/2003 | Hughes et al. | 370/230 |
| 6,658,652 B1 | * | 12/2003 | Alexander et al. | 717/128 |
| 2002/0039195 A1 | * | 4/2002 | Miyake | 358/1.15 |
| 2004/0213155 A1 | * | 10/2004 | Xu et al. | 370/232 |
| 2005/0210451 A1 | * | 9/2005 | Dimpsey et al. | 717/120 |
| 2006/0223585 A1 | * | 10/2006 | Legg | 455/560 |
| 2007/0076598 A1 | * | 4/2007 | Atkinson et al. | 370/229 |
| 2008/0091912 A1 | * | 4/2008 | Fleming et al. | 711/170 |
| 2008/0219599 A1 | * | 9/2008 | Hopkins et al. | 382/312 |
| 2008/0222352 A1 | * | 9/2008 | Booth et al. | 711/108 |
| 2010/0134507 A1 | * | 6/2010 | Paquette et al. | 345/545 |

OTHER PUBLICATIONS

Courcoubetis, C.; Kesidis, G.; Ridder, A.; Walrand, J.; Weber, R., "Admission control and routing in ATM networks using inferences from measured buffer occupancy," Communications, IEEE Transactions on, vol. 43, No. 234, pp. 1778,1784, Feb./Mar./Apr. 1995.*

* cited by examiner

*Primary Examiner* — Idriss N Alrobaye
*Assistant Examiner* — Ronald Modo
(74) *Attorney, Agent, or Firm* — Nixon & Vanderhye P.C.

(57) ABSTRACT

A data processing apparatus is provided comprising a buffer for buffering data contained in a data stream generated by a data stream generator and received by a data stream receptor. Buffer occupancy tracking circuitry is provided and configured to maintain a high buffer utilisation value providing an indication of a high buffer occupation level for a given time period during utilisation of the buffer. Alternatively, in an apparatus where the buffer is implemented in dedicated memory, the buffer occupancy tracking circuitry is configured to store a programmable buffer size limit controlling a maximum allowable buffer storage capacity.

22 Claims, 7 Drawing Sheets

BUFFERING OF A DATA STREAM

TECHNICAL FIELD

The present invention relates to data processing. In particular, the present invention relates to buffering of a data stream.

BACKGROUND

It is known to use buffers to temporarily store information from a data stream pending output of that data stream to its ultimate destination. The use of the buffer enables bursts in volume of a data stream to be accommodated where there is a limited capacity for routing data from a data stream generator to a data stream receptor. For example, there may be a bus of limited bandwidth or a fixed number of data pins providing a maximum possible data transfer capacity.

Buffering of data streams is frequently implemented in tracing systems, where buffering of trace data streams is performed. It is known to use a trace buffer to reduce the number of trace pins required by smoothing out bursts in incoming trace data so that only enough trace pins to support an average trace bandwidth are required, rather than sufficient trace pins to support a peak in the output of the trace data source. However, in implementing buffers such as trace buffers there is a problem to determine how big the capacity of the buffering circuitry needs to be to suit a particular data processing situation.

Buffer capacity estimation is typically done by performing a number of different test runs in test systems implemented on, for example, Field Programmable Gate Arrays (FPGAs) using a number of different fixed buffer sizes and seeing what happens in terms of system performance in view of the different buffer sizes. However, the process of determining an appropriate buffer size in this way is time consuming and inefficient, and cannot be used when a data processing system has been fabricated on real silicon where the buffer memory will typically be implemented as a fixed size random access memory (RAM).

Accordingly, there is a requirement for providing more efficient buffering of data streams that is adaptable to the diverse buffering requirements of different data processing tasks.

SUMMARY

A first aspect provides apparatus for processing data comprising: a data stream generator configured to generate a data stream; a buffer configured to receive said data stream and to buffer data contained in said data stream; a data stream receptor configured to receive data of said data stream from said buffer; buffer occupancy tracking circuitry configured to monitor an occupancy level of said buffer resulting from transfer of said data stream between said data stream generator and said data stream receptor and to maintain a highest buffer utilisation value providing an indication of a highest buffer occupation level for a given time period during utilisation of said buffer.

Provision of buffer occupancy tracking circuitry that monitors the occupancy level of the buffer while a data stream is being transferred between the data stream generator and the data stream receptor allows a highest buffer utilisation value to be maintained and provides an indication of the highest buffer occupation level for a given time period during utilisation of the buffer. This provides a useful record of how much of the memory is actually being used for the purpose of buffering in a real buffering situation and makes allocation of an appropriate buffer size more efficient to implement. For example, a number of different trial runs involving buffering different data streams can be performed on a FPGA, and the highest buffer utilisation values recorded for each test run can be used to provide a realistic assessment of how big the buffer needs to be in the final silicon-fabricated design. Similarly, in a device that has already been fabricated in silicon, the highest buffer utilisation value can be used to track the actual utilisation of the buffer memory in real time, and this information can be fed back into subsequent fabrications to improve the efficiency of the design.

Although the data stream that is buffered can comprise any sort of data stream, in some embodiments, the data stream comprises a diagnostic data stream containing diagnostic data for a data processing apparatus. In performing test and evaluation of a data processing apparatus diagnostic data is very valuable and by its nature, diagnostic data tends to be bursty in nature. Thus, maintaining the highest buffer utilisation value in data processing apparatus having a buffer and buffer occupancy tracking circuitry allows for an efficient assessment of buffer capacity requirements to be performed.

It will be appreciated that the diagnostic data of the data stream could be, for example, debug data. However, in one embodiment the diagnostic data stream corresponds to a trace data stream. Buffering of trace data on route to a trace port is commonly performed in data processing systems and the monitoring of the highest buffer utilisation value provides the opportunity to track utilisation of the trace buffer in a more efficient manner.

In one embodiment, the buffer is implemented as a dedicated memory that is provided specifically for the purpose of buffering the data stream. In an alternative embodiment, the buffer is implemented as at least a portion of the system memory. The flexibility afforded by the ability to allocate of different portions of system memory to different purposes allows for convenient dynamic adaptation of the capacity of the memory that is allocated to buffering.

It will be appreciated that the efficient utilisation of the buffer memory could be provided via tracking only the highest buffer utilisation value. However, in some embodiments the buffer occupancy tracking circuitry is also configured to store a current buffer utilisation value providing an indication of a current buffer utilisation at, for example, a current processing cycle. This provides a convenient way to monitor and maintain an appropriate value of the high buffer utilisation value and provides further information with regard to buffer utilisation on, for example, a cycle-by-cycle basis.

It will be appreciated that the buffer could comprise a fixed size according to the size of physical memory in which the buffer is implemented. However, in some embodiments the buffer occupancy tracking circuitry is configured to store a buffer size limit controlling a maximum allowable buffer storage capacity. In some such embodiments the buffer size limit is programmable. This provides flexibility in adapting the data processing apparatus to suit different processing requirements and by programming the maximum allowable buffer storage capacity to be a value less than the actual maximum physical capacity of the buffer, the implications of reducing the memory allocated to buffer storage of the data stream can be readily investigated.

In some embodiments where the buffer is implemented in dedicated memory, the buffer size limit is set to be less than a memory capacity of a memory in which the buffer is implemented. This provides a convenient method via which to test the implications of different capacities of dedicated memory in the buffering of the data stream without actually having to physically replace the dedicated memory by a number of different memory circuits of different sizes.

In some embodiments in which the buffer is implemented in a system memory, the buffer monitoring circuitry is configured to perform a comparison between the current buffer occupancy level and the buffer size limit to dynamically allocate more of the memory capacity to the buffer depending upon a result of the comparison. The ability to dynamically vary the portion of system memory allocated to buffering of the data stream reduces the likelihood of buffer overflow and improves the overall efficiency of the data processing system.

It will be appreciated that the highest buffer occupation level could be stored in any type of memory, but in one embodiment, the highest buffer occupation level is stored in a dedicated register. This makes the highest buffer occupation level readily accessible to the data processing system.

It will be appreciated that the highest buffer occupation level could be updated as and when required, for example for every hundred processing cycles or for a variable number of processing cycles depending upon the volume of output of the trace data stream. However, in one embodiment the highest buffer occupation level is updated for each and every processing cycle.

It will be appreciated that the data processing apparatus according to the present technique could be implemented on any type of integrated circuit or indeed using a plurality of integrated circuits. However, in one embodiment, the data processing apparatus comprises a Field Programmable Gate Array. The use of an FPGA provides a flexibility to perform a plurality of trial runs whilst readily varying the configuration of the circuitry.

It will be appreciated that the data stream receptor could be any one of a number of different components. However, in some embodiments the data stream receptor is one of a memory, a peripheral, a trace port and a frame buffer.

It will be appreciated that the data stream receptor could be configured to store the data stream in a number of different ways. However, in one embodiment the data stream receptors are configured to store the data stream in a system memory.

In some embodiments the data processing apparatus is fabricated on a single integrated circuit.

In some embodiments the data stream receptor is configured to output in real time the data stream to a device external to the integrated circuit.

In some embodiments the buffer occupancy tracking circuitry, in addition to storing the highest buffer utilisation value, is configured to store a buffer size limit providing an indication of the maximum allowable buffer storage capacity, the stored buffer size limit being accessible by a device external to the integrated circuit. This provides a flexibility to change the setting of the maximum buffer storage capacity to investigate the options of providing different buffer capacities in a finally fabricated device.

In some embodiments the buffer occupancy tracking circuitry is configured to store, in addition to the highest buffer utilisation value, a current buffer utilisation value providing an indication of the current buffer utilisation value at a current processing cycle such that the stored current buffer utilisation value is readable by the device external to the integrated circuit. This improves interaction between the integrated circuit and external analysis tools.

In some such embodiments where the device is implemented on an integrated circuit the buffer is implemented as a dedicated memory.

A second aspect provides apparatus for processing data comprising:

a data stream generator configured to generate a data stream;

a buffer configured to receive said data stream and to buffer data contained in said data stream, said buffer being implemented as a dedicated memory; and a data stream receptor configured to receive data of said data stream from said buffer; and buffer occupancy tracking circuitry configured to store a programmable buffer size limit controlling a maximum allowable buffer storage capacity.

According to this aspect, implementing a buffer in dedicated memory and providing buffer occupancy tracking circuitry configured to store a programmable buffer size limit controlling a maximum allowable buffer storage capacity offers the flexibility of testing the effects of different maximum buffer sizes without having to substitute the physical buffer memory to do so.

A third aspect provides a method for processing data comprising the steps of:

generating a data stream;

receiving said data stream at a buffer and buffering data contained in said data stream;

receiving at a data stream receptor data of said data stream from said buffer;

monitoring an occupancy level of said buffer resulting from transfer of said data stream between said data stream generator and said data stream receptor and for maintaining a highest buffer utilisation value providing an indication of a highest buffer occupation level for a given time period during utilisation of said buffer.

A fourth aspect provides a method for processing data, said method comprising the steps of:

generating a data stream using a data stream generator;

receiving at a buffer said data stream and buffering data contained in said data stream, said buffer being implemented as a dedicated memory;

receiving at a data stream receptor, data of said data stream from said buffer; and storing a programmable buffer size limit controlling a maximum allowable buffer storage capacity.

The above, and other objects, features and advantages will be apparent from the following detailed description of illustrative and non-limiting embodiments which is to be read in connection with the accompanying drawings.

DETAILED DESCRIPTION

Figure 1:
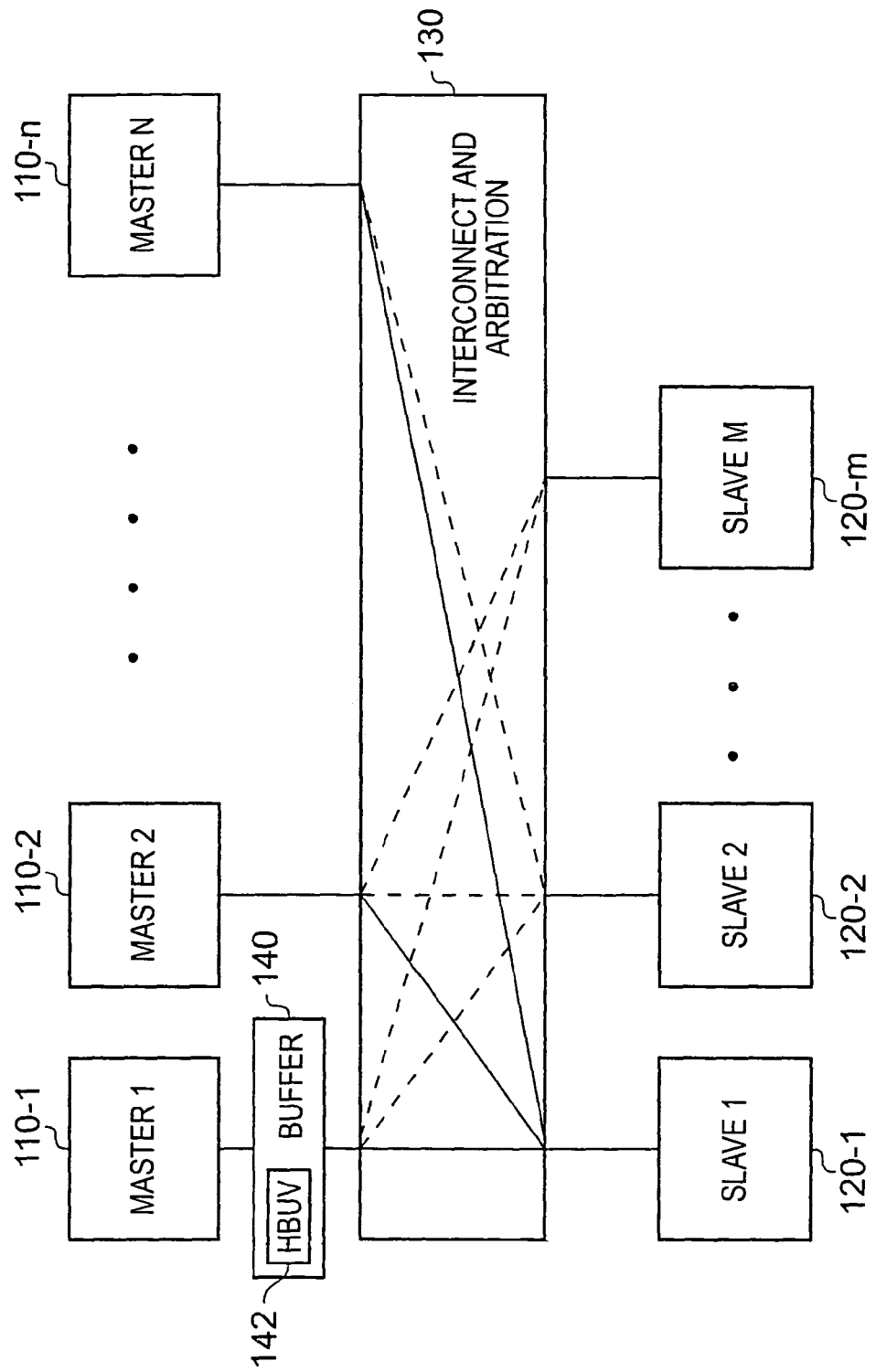
FIG. 1 schematically illustrates a data processing apparatus comprising a plurality of master devices and a plurality of slave devices and in which one of the master devices has buffer occupancy tracking circuitry according to a first example embodiment.

FIG. 1 schematically illustrates a data processing system having a plurality of master devices and a plurality of slave devices and in which at least one of the master devices comprises buffer occupancy tracking circuitry according to an example embodiment.

The system of FIG. 1 comprises a plurality of master devices 110-1, 110-2, . . . 110-n. The plurality of master devices are in data communication with a plurality of slave devices 120-1, 120-2, . . . 120-m. Interconnect and arbitration circuitry 130 is provided as part of the data processing system and enables data communication to be established between any one of the plurality of master devices and any one of the plurality of slave devices or indeed for a given master device to send a communication in parallel to a plurality of the slave devices. In addition, multiple master devices can respectively communicate with different slave devices in parallel, utilising different paths of the interconnect. For example, master one communicates with slave two substantially simultaneously with master two communicating with slave three. Examples of master devices include a processor or a trace data source. Examples of slave devices include a memory, a peripheral, a trace port and a frame buffer.

Arbitration is performed to manage contention of communication resources on the communication buffers connecting the master and slave devices. The first of the master devices 110-1 comprises buffering circuitry 140 configured to update a register 142 holding a highest buffer utilisation value (HBUV) providing an indication of the highest buffer occupation level for a given period of time during utilisation of the buffering circuitry 140. The buffering circuitry 140 is used to buffer streaming data generated by the master device 110-1 for output to one or more of the slave devices 120-1, 120-2, . . . 120-m and is used to manage the situation where there is a high level of contention for resources connecting the master devices to the slave devices, i.e. when there is not currently a clear path to the desired destination slave device for the data output by the master device 110-1 (as mediated by the interconnect and arbitration circuitry 130). The buffering circuitry 140 is also used when the slave can accept data at a slower rate than the master device can generate data.

The highest buffer utilisation value stored in the register 142 is updated on a cycle-by-cycle basis (i.e. for each processing cycle of the associated master device). Thus, for example, when the data processing system of FIG. 1 is implemented as a Field Programmable Gate Array, the value stored in the highest buffer utilisation value register 142 at the end of a given test run can be used to assess what memory capacity is actually required in the buffer. In a silicon-fabrication of an integrated circuit, the value stored in the highest buffer utilisation value register 142 can be used to establish whether or not the utilisation of the buffering circuitry 140 is as was expected at the design stage, and this information can be used in subsequent fabrications (i.e. updated versions) of the data processing apparatus.

In the embodiment of FIG. 1 a plurality of master devices and a plurality of slave devices are shown. However, in alternative embodiments, a single master device and/or a single slave can be provided. In arrangements, for example, with a single master and a single slave device, the buffer and buffer occupancy tracking circuitry are employed to handle situations where the slave cannot accept data as quickly as the data is generated by the master device.

Figure 2:
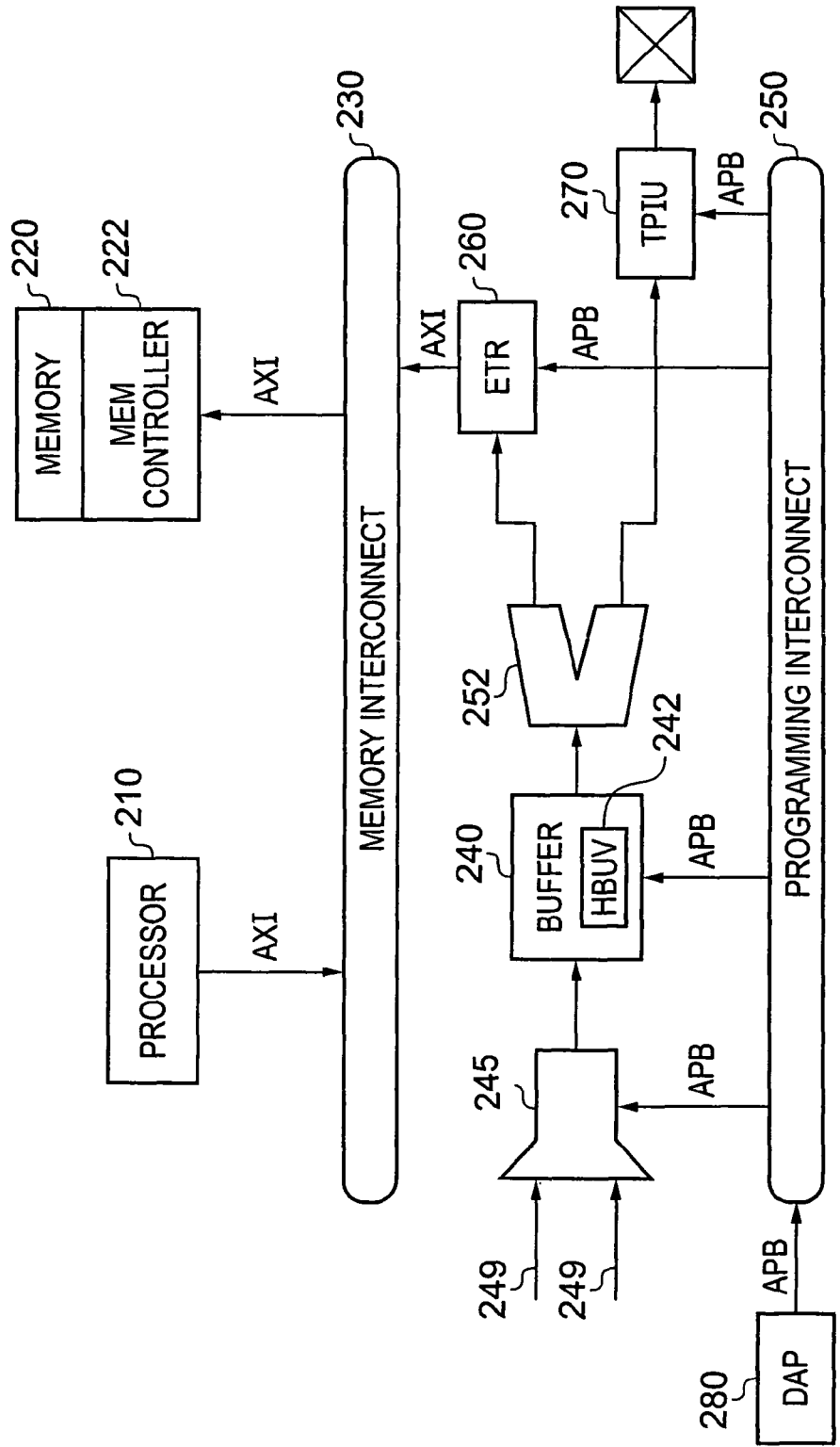
FIG. 2 schematically illustrates a data processing system according to an example embodiment in which the buffering of the data stream is implemented in a dedicated memory.

FIG. 2 schematically illustrates data processing apparatus according to a first embodiment, in which the buffering of the data stream is performed in a dedicated memory that is distinct from the system memory of the data processing apparatus. The data processing system of FIG. 2 comprises: a processor 210; a system memory 220 comprising a memory controller 222; a memory interconnect 230 via which the processor 210 and the memory 220 communicate using a protocol such as the AXI protocol. The system further comprises a buffer 240, which in this case buffers trace data, and the buffer stores a highest buffer utilisation value 242. A stream of trace data 249 is fed to the buffer 240 via a funnel 245 and the data output by the buffer 240 is supplied to a replicator 252, which sends one copy of the buffered trace data to an embedded trace router 260 and a further copy of the buffered trace data to a trace port interface unit 270. The output of the trace port interface unit 270 is applied to pins of the integrated circuit for output.

The funnel 245, the buffering circuitry 240, the embedded trace router 260 and the trace port interface unit 270 are all configured to receive data via a programming interconnect 250. A debug access port 280 is also in communication with the programming interconnect 250. All of the connections to the programming interconnect 250 are implemented via an advanced peripheral bus (APB). The buffering circuitry 240 reduces the number of trace pins required on the integrated circuit on which the data processing apparatus is fabricated, by smoothing out the bursts in trace data that occur due to natural variability in the rate at which trace data 249 is received from the trace data source. Use of the buffering circuitry 240 means that enough trace pins can be provided to accommodate the average trace bandwidth rather than having to accommodate the peak trace bandwidth.

The buffering circuitry 240 is designed to ensure that as little as possible trace data is lost when there are temporary peaks in the output of the trace data source, i.e. peaks in the receipt of trace data by the buffering circuitry. The advanced peripheral bus that connects each of the buffering circuitry 240, the funnel 245, the embedded trace router 260 and the trace port interface unit 270 to the programming interconnect 250 is a low speed bus. However, the AXI bus that connects the embedded trace router 260 to the memory interconnect and connects the processor 210 and the memory controller 222 to the memory interconnect 230 is a high speed memory access bus.

In the arrangement of FIG. 2, the trace data is buffered within dedicated memory within the buffering circuitry 240 and the system is configured to enable copying of the buffered data to the system memory 220 via a path including the replicator 252 and the embedded trace router 260. In addition to copying the buffered data to the system memory 220, the buffered trace data can also be output by the replicator 252 to the pins of the integrated circuit via the trace port interface unit 270.

The buffering circuitry 240 monitors an occupancy level of the dedicated memory corresponding to memory circuitry within the buffer 240 itself. The buffering circuitry 240 maintains a current value of the highest buffer utilisation value (HBUV) in the register 242 providing an indication of the highest buffer occupation level for a given period of time during utilisation of the buffer. The highest buffer utilisation value 242 is updated, for example, every processing cycle and the value stored at the end of a test run is used to provide an indication of an appropriate size of buffer storage.

Figure 3:
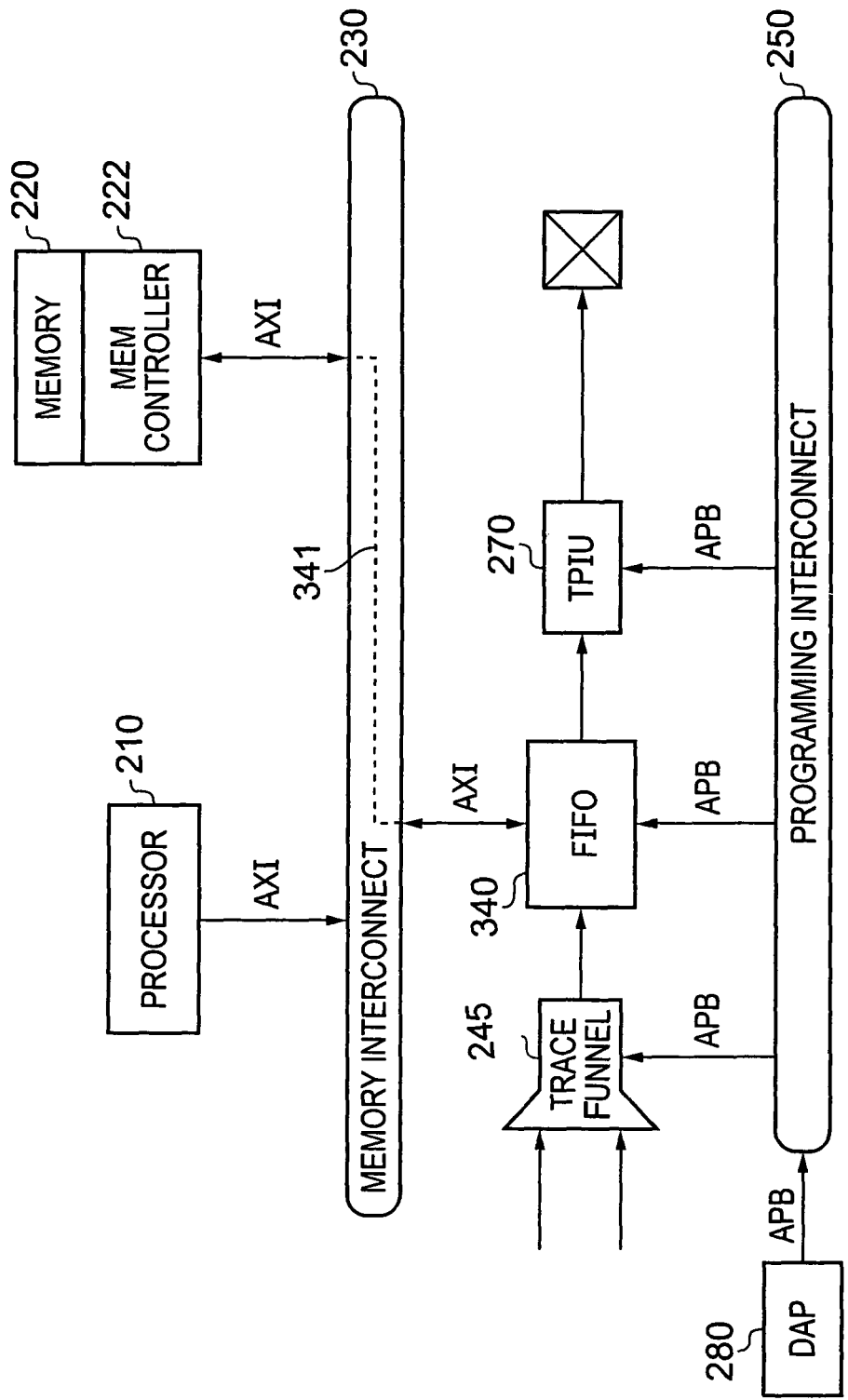
FIG. 3 schematically illustrates a further example embodiment in which the buffering of the data stream is performed by implementing a portion of system memory to perform the buffering.

FIG. 3 schematically illustrates an alternative example embodiment in which the buffer is implemented as a portion of the system memory, rather than as dedicated memory (within buffering circuitry 240 of FIG. 2). The components of FIG. 3 are very similar to those of FIG. 2 and corresponding components are provided with the same corresponding reference numerals. A difference between the arrangement of FIG. 3 and the arrangement FIG. 2 is that FIG. 3 comprises FIFO circuitry 340, which buffers incoming trace data by routing it via the AXI bus communication path 341 to the system memory 220 via the memory controller 222. The FIG. 2 arrangement has buffer circuitry 240 comprising dedicated memory for storage of the buffered data. Thus there is no dedicated memory provided within the FIFO circuitry 340 for buffering the incoming trace data, but instead a portion of the system memory 220 is allocated for buffering purposes.

Data output by the FIFO 340 is supplied directly to the trace port interface unit 270 prior to output to pins of the integrated circuit. As in FIG. 2, a memory interconnect 230 in FIG. 3 connects the processor 210 and the memory 220 to the FIFO 340 and the trace port interface unit 270, whilst the programming interconnect 250 enables communication between the debug access port 280 and the trace funnel 245, and the FIFO 340 and the trace port interface unit 270. Apparatus elements present in FIG. 2 but absent from FIG. 3 are the replicator 252 and the embedded trace router 260. Clearly, since the incoming trace data stream is buffered directly in system memory, there is no requirement to replicate the output of the FIFO 340 and specifically route it to the memory 220 via the embedded trace router 260. Providing the buffering of the incoming stream of trace data in system memory allows an operating system of the processor 210 to dynamically (in real time) allocate more or less system memory to the task of buffering incoming trace data in accordance with the monitored level of the highest buffer utilization value 242. Similarly to the system of FIG. 2, the FIFO 340 also controls storage of the highest buffer utilization value in a register Inside the FIFO 340.

Figure 4:
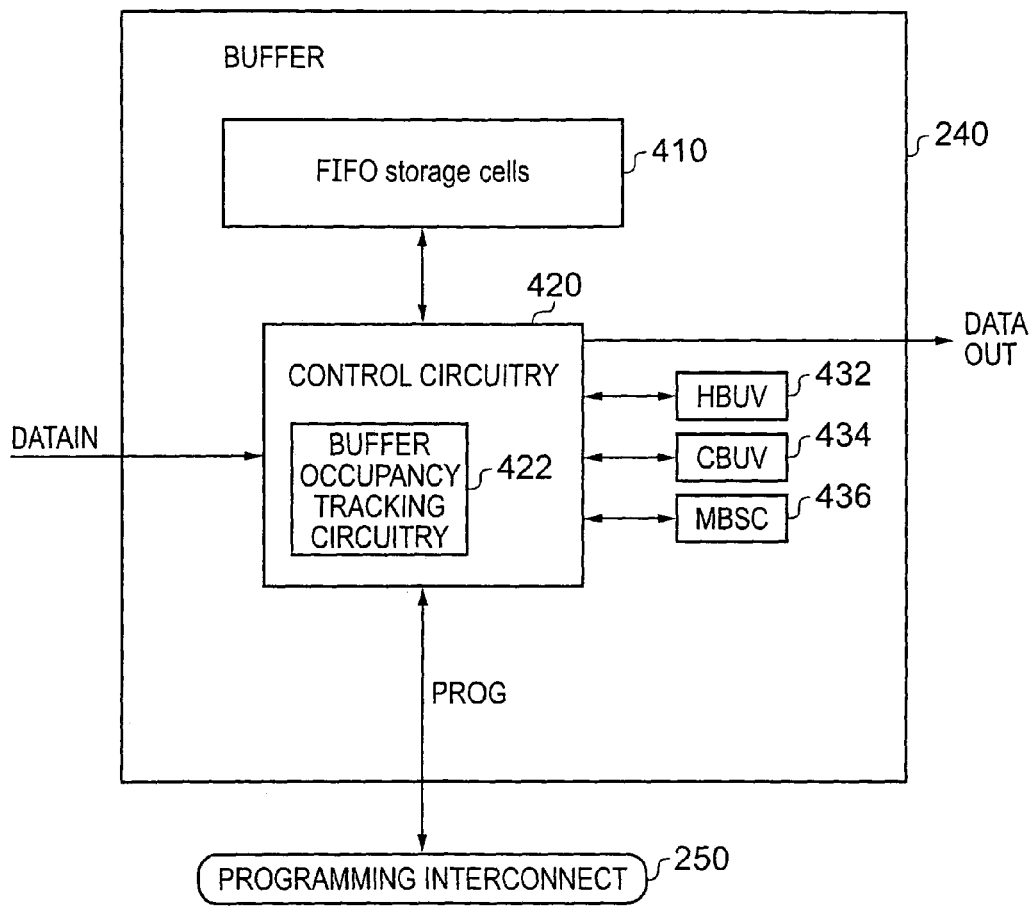
FIG. 4 schematically illustrates in more detail the buffer occupancy tracking circuitry according to an example embodiment.

FIG. 4 schematically illustrates the buffering circuitry 240 of FIG. 2 in more detail. The buffering circuitry 240 comprises a set of FIFO storage cells 410 representing the dedicated memory for storage of the incoming trace data, control circuitry 420 comprising buffer occupancy tracking circuitry 422 and a set of three registers 432, 434, 436. A first register is an HBUV register 432 for storing a highest buffer utilisation value providing an indication of a highest buffer occupation level for a given time period during utilisation of the buffering circuitry 240. A second register, denoted a CBUV register 434 stores a current buffer utilisation value representing the current occupation level of the FIFO storage cells 410 in a current processing cycle. The value stored in the CBUV register 434 will typically be different from the highest buffer utilisation value stored in the register 432.

A third register, denoted an MBSC register 436 stores a maximum allowable buffer storage capacity. The value in the MBSC register 436 is programmable by a user via the programming interconnect 250. The maximum allowable buffer storage capacity value in the MBSC register 436 can be either read or written to via the programming interconnect 250, whereas the HBUV register 432 and the CBUV register 434 can be read via the programming interconnect 250, but cannot be written to.

Incoming data such as data from a trace data source (or general data source) is received by the buffering circuitry 240 and passed to the control circuitry 420 whereupon it is directed to the FIFO storage cells 410. The buffer occupancy tracking circuitry tracks on a cycle-by-cycle basis what the occupation level of the FIFO storage cells 410 is and stores the highest value in the HBUV register 432. The occupation level in the current processing cycle is stored in the CBUV register 434. The value in the maximum allowable buffer storage capacity register 436 is set such that it is less than or equal to the capacity of the dedicated memory represented by the FIFO storage cells 410. The value stored in the register 436 is writable externally and thus can be programmed and reprogrammed via the programming interconnect 250. In the embodiment of FIG. 3, the FIFO circuitry 340 comprises the control circuitry 420 and the buffer occupancy tracking circuitry of FIG. 4, but has no dedicated memory corresponding to the FIFO storage cells 410, because the buffering is done directly to the system memory. The FIFO circuitry 340 maintains three registers identical to the HBUV register 432, CBUV register 434 and MBSC register 436 of FIG. 4. These registers can be provided either in the FIFO circuitry 340 itself or as part of system memory 220. According to embodiments of the invention, different individual one of or combinations of the HBUV register 432, CBUV register 434 and MBSC register 436 can be provided in individual embodiments. In the embodiment of FIG. 2 only the HBUV register 242 is shown for simplicity, but, as shown in FIG. 4, the buffer 240 of FIG. 2 actually comprises all three registers, i.e. the HBUV register 432, CBUV register 434 and MBSC register 436. In one embodiment only the HBUV register 432 is provided but the CBUV and MBSC registers are absent. In another embodiment only the MBSC register 436 is present whilst the HBUV register 432 and CBUV register 434 are absent. It will be appreciated that further alternative embodiments comprise different combinations of these three registers.

Figure 5:
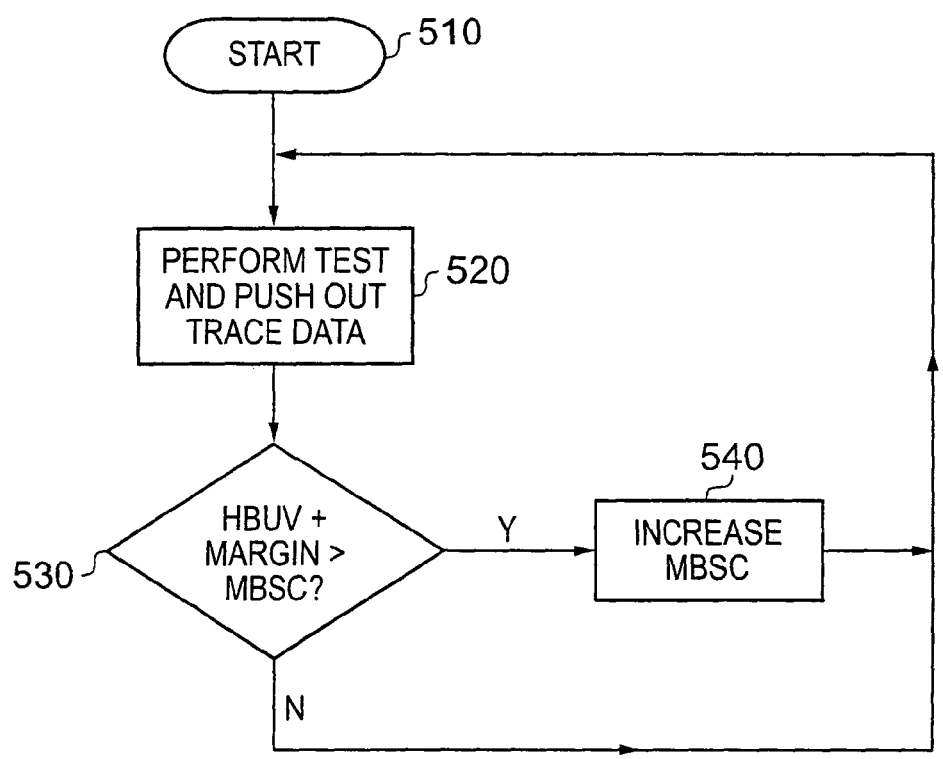
FIG. 5 is a flow chart schematically illustrating how a maximum allowable buffer storage capacity is managed according to an example embodiment.

FIG. 5 is a flow chart that schematically illustrates how the value within the MBSC register 436 of FIG. 4 is utilised and updated in the embodiment of FIG. 3 where the buffer is implemented in the system memory rather than in the dedicated memory. The process begins at a start stage 510 and proceeds to stage 520, where a test is performed using the apparatus of FIG. 3 whereupon trace data from a trace data source and received via the trace funnel 245 is pushed out through the FIFO 340. The process then proceeds to stage 530, where it is determined whether the highest buffer ☐tilization value stored in the register 432 plus a "margin" is greater than the maximum buffer storage capacity read from the register 436 (see FIG. 4). The margin in this case is a predetermined margin set to reduce data loss that could otherwise occur as a result of buffer overflow. Provision of the margin enables the set value of the maximum buffer storage capacity to be increased when the buffer becomes nearly full but not yet actually full. If at stage 530 it is determined that (HBUV+Margin)>MBSC then the process proceeds to stage 540 where the value stored in the MBSC register is increased and a correspondingly larger portion of system memory is allocated for buffering. If, on the other hand it is determined at stage 530 that (HBUV+Margin) is less than or equal to the value stored in the MBSC register then the process proceeds back to stage 520 where further testing is performed. Although the margin is predetermined in the embodiment of FIG. 5, in alternative embodiments, the margin is programmable and thus can be readily adapted to different processing conditions. In the embodiment of FIG. 5, once the buffer size has been increased, it is not subsequently decreased. However, in alternative embodiments, the value stored in the MBSC can also be decreased according to, for example, the current buffer utilization value plus a further margin to more accurately reflect current processing conditions.

The overall effect of the processes illustrated by the flow chart of FIG. 5 is that the highest buffer utilisation value in a given test procedure is monitored and the maximum allowable buffer storage capacity is dynamically adapted according to the actual utilisation of the buffering resource such that an appropriate buffering memory capacity is provided and data loss is reduced.

Figure 6:
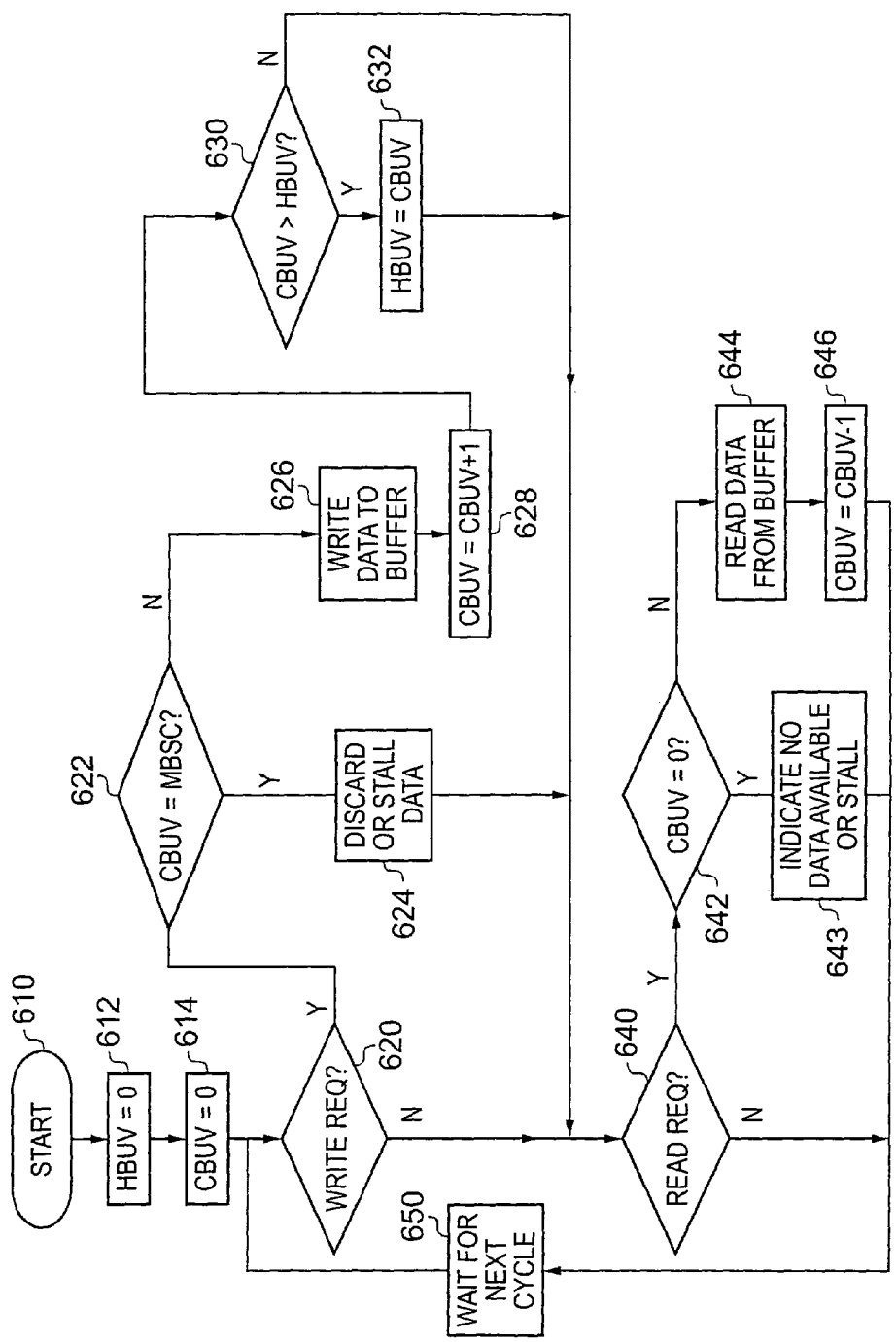
FIG. 6 schematically illustrates how the current buffer utilisation value is updated in an example embodiment in which the buffering of the data stream is performed in dedicated memory.

FIG. 6 is a flow chart that schematically illustrates a data buffering process as implemented in the embodiment of FIG. 2, where the buffering circuitry is implemented in dedicated memory. The process begins at start stage 610 and proceeds to stage 612, where the highest buffer utilisation value is initialised to zero and then to stage 614 where the current buffer utilisation value is set to zero. Next, at stage 620 it is determined whether or not a write request has been received from a master device (see FIG. 1). If a write request has in fact been received, then the process proceeds to stage 622 where it is determined whether the current buffer utilisation value in the CBUV register 434 is equal to the maximum allowable buffer storage capacity in the MBSC register 436. If the current buffer utilisation value is in fact equal to the maximum buffer storage capacity before data associated with the write request has been written to the buffer, then the process proceeds to stage 624 where the excess data is either discarded or the data is stalled pending available storage capacity in the buffering circuitry. In cases where the data is stalled it is possible that it will be discarded elsewhere in the system.

If, on the other hand, at stage 622 the current buffer utilisation value is not found to be equal to the maximum buffer storage capacity then the process proceeds to stage 626 where the data corresponding to the write request is written to the buffer and then to stage 628 where the current buffer utilisation value is incremented by 1. In this case we are considering a write request for writing a single unit of data. This could be a multi-bit unit. The current buffer utilisation value register 434 and the maximum buffer storage capacity register 436 are configured consistently with the size of the single data unit.

After stage 628 the process proceeds to stage 630, where it is determined whether or not the current buffer utilisation value is greater than the highest buffer utilisation value. If the answer is no, then the process proceeds to stage 640. If, on the other hand, the current buffer utilisation value is found to exceed the highest buffer utilisation value at stage 630 the process proceeds to stage 632, where the highest buffer utilisation value stored in HBUV register 432 is reset to be equal to the current buffer utilisation value stored in CBUV register 434, i.e. the highest buffer utilisation value is updated according to the most recently measured occupancy level. Following stage 632 the process proceeds to stage 640.

At stage 640 it is determined whether or not a read request has been received from the replicator 252 (see FIG. 2) to read data from the trace buffer 240. Note that equivalently to the replicator 252 making read requests from the buffer 240, the buffer 240 can make write requests to the replicator 252 to achieve the same result. If no read request has been received then the process proceeds to stage 650 and the next processing cycle is awaited prior to returning to stage 620. If, on the other hand, it is determined that a read request has in fact been received at stage 640, then the process proceeds to stage 642 where it is determined whether or not the current buffer utilisation value is equal to zero (as a result of there being no data currently stored in the buffering circuitry). If this is the case then the process proceeds to stage 643 where it is indicted to the replicator 252 that no data is available or the process is stalled pending data becoming available in the buffer. After stage 643, the process proceeds to stage 650 where the next processing cycle is awaited and then to stage 620 where it is queried whether or not a write request has been received. If, on the other hand it is determined at stage 642 that the current buffer utilisation value is greater than or equal to zero and there is in fact data currently available to be read, then the process indicates this to the replicator 252 and proceeds to stage 644, where a unit of data is read from the buffering circuitry and then proceeds to stage 646 where the current buffer utilisation value is decremented by one unit to reflect the fact that one unit has been output from the buffering circuitry. The process then proceeds to stage 650 where the next processing cycle is awaited and the whole process is repeated again from stage 620 onwards.

Figure 7:
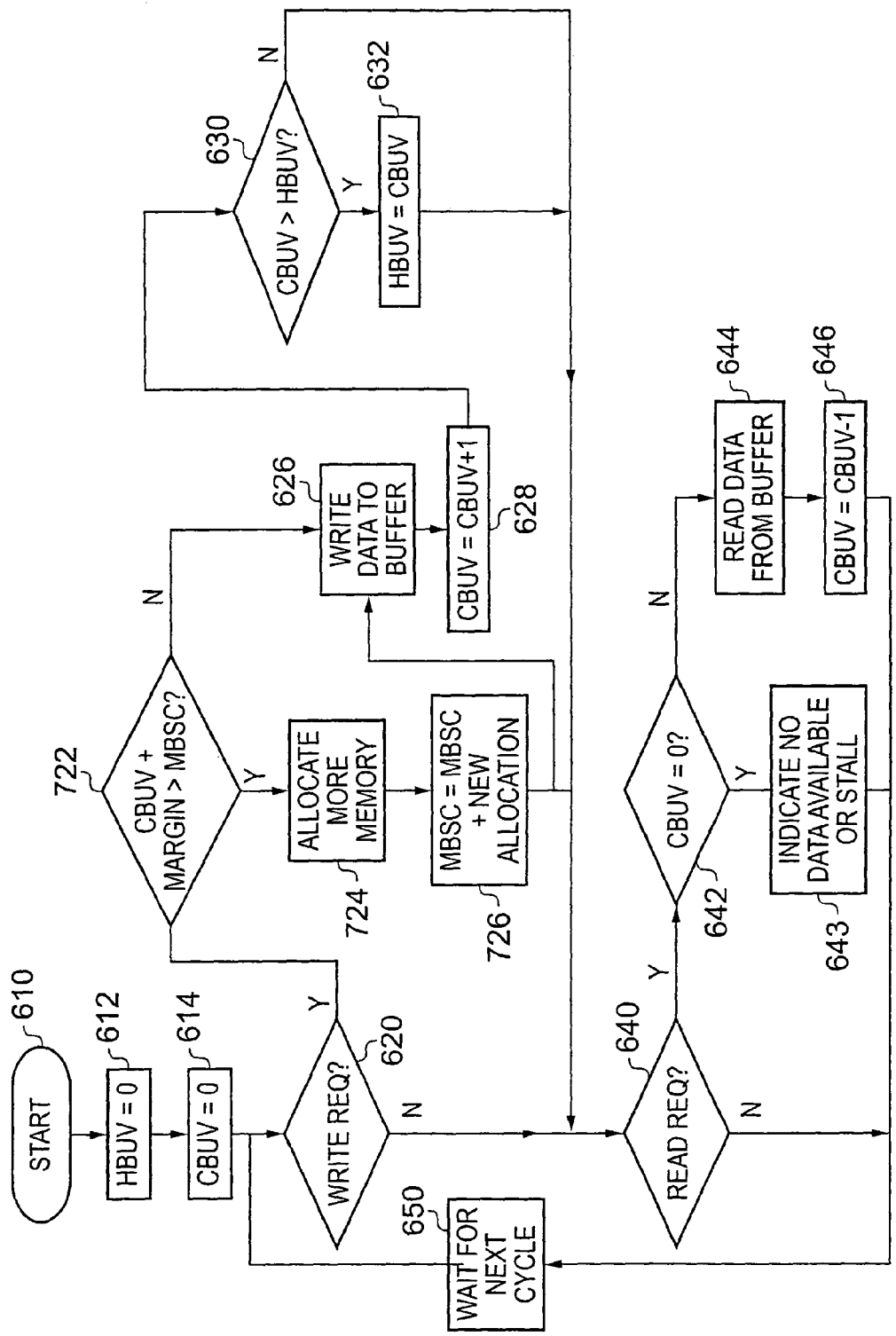
FIG. 7 is a flow chart schematically illustrating how buffering of a data stream is performed and how the current buffer utilisation value is updated in an example embodiment in which the buffer is implemented as system memory.

FIG. 7 schematically illustrates a flow chart indicating how trace data is buffered according to an example embodiment corresponding to the example embodiment of FIG. 3, where the buffer is implemented in system memory rather than dedicated memory. The stages of the flow chart of FIG. 7 are very similar to the stages of the flow chart of FIG. 6 and the correspondingly numbered stages are as described above in relation to FIG. 6. However, where the flow chart of FIG. 7 differs from that of FIG. 6 is in stages 722, 724 and 726. At stage 722, after receipt of a write request, it is determined whether the current buffer utilisation value plus a predetermined margin greater than the maximum allowable buffer storage capacity (compare with stage 622 of FIG. 6 where the buffer size is fixed and cannot be dynamically increased). In the case of FIG. 7, if it is determined at stage 622 that the current buffer utilisation value plus margin is in fact greater than the maximum allowable buffer storage capacity then the process proceeds to stage 724, where the operating system dynamically allocates more system memory to the buffering of the incoming trace data stream. Then the process proceeds to stage 726 where the maximum allowable buffer storage capacity is set equal to the previously-set maximum buffer storage capacity plus the additional new allocation of system memory just dedicated to the buffering process. Following stage 726, the process then proceeds to stage 626 and the incoming data corresponding to the write request is written to the buffer that has been newly increased in size and the current buffer utilisation value is incremented by one unit at stage 628.

If, on the other hand at stage 722 it is determined that the current buffer utilisation value plus margin is less than or equal to the maximum buffer storage capacity then the process proceeds to stage 626 and then stage 628 as described above with reference to FIG. 6.

By way of contrast, if FIG. 6 where the current buffer utilisation value was found to be equal to the maximum buffer storage capacity, the data was either discarded or stalled at stage 624 and then the process proceeded to stage 640 querying whether a read request had been received rather than proceeding to stage 626 as in the FIG. 7 embodiment.

Although illustrative example embodiments have been described in detail herein with reference to the accompanying drawings, it is to be understood that the claims are not limited to those precise embodiments, and that various changes and modifications can be effected therein by one skilled in the art without departing from the scope and spirit of the claims.

We claim:
1. Apparatus for processing data comprising:
a data stream generator configured to generate a data stream;
a buffer configured to receive said data stream and to buffer data contained in said data stream;

a data stream receptor configured to receive data of said data stream from said buffer;

buffer occupancy tracking circuitry configured to monitor an occupancy level of said buffer resulting from transfer of said data stream between said data stream generator and said data stream receptor and to maintain a highest buffer utilisation value providing an indication of a highest buffer occupation level for a given time period during utilisation of said buffer, wherein in response to a current buffer utilisation value during said given time period is found to exceed the highest buffer utilisation value, then the buffer occupancy tracking circuitry is configured to update the highest buffer utilisation value to be equal to the current utilisation value.

2. Apparatus as claimed in claim 1, wherein said data stream comprises a diagnostic data stream containing diagnostic data for said data processing apparatus.

3. Apparatus as claimed in claim 2, wherein said data stream generator is a trace source and said diagnostic data stream is a trace data stream.

4. Apparatus as claimed in claim 3, wherein said buffer is implemented as a dedicated memory.

5. Apparatus as claimed in claim 3, wherein said data processing apparatus comprises system memory and wherein said buffer is implemented as at least a portion of said system memory.

6. Apparatus as claimed in claim 3, wherein said buffer occupancy tracking circuitry is configured to store a current buffer utilisation value providing an indication of a current buffer utilisation at a current processing cycle.

7. Apparatus as claimed in claim 6, wherein said buffer occupancy tracking circuitry is configured to store a buffer size limit controlling a maximum allowable buffer storage capacity.

8. Apparatus as claimed in claim 7, wherein said buffer size limit is programmable.

9. Apparatus as claimed in claim 8, wherein said buffer is implemented in dedicated memory and wherein buffer size limit is less than a memory capacity of a memory in which said buffer is implemented.

10. Apparatus as claimed in claim 9, wherein said buffer is implemented in a system memory and said buffer monitoring circuitry is configured to perform a comparison between said current buffer occupancy level and said buffer size limit and to dynamically allocate more of said memory capacity to said buffer depending upon a result of said comparison.

11. Apparatus as claimed in claim 3, wherein said highest buffer occupation level is stored in a dedicated register.

12. Apparatus according to claim 3, wherein said highest buffer occupation level is updated for each processing cycle.

13. Apparatus as claimed in claim 3, wherein said data processing apparatus comprises a Field Programmable Gate Array.

14. Apparatus as claimed in claim 3, wherein said data stream receptor is configured to store said data stream in a system memory.

15. Apparatus as claimed in claim 3, wherein said data processing apparatus is fabricated on an integrated circuit.

16. Apparatus as claimed in claim 15, wherein said data stream receptor is configured to output in real time said data stream to a device external to said integrated circuit.

17. Apparatus as claimed in claim 16, wherein said buffer occupancy tracking circuitry is configured to store a buffer size limit providing an indication of a maximum allowable buffer storage capacity, said stored buffer size limit being accessible by a device external to said integrated circuit.

18. Apparatus as claimed in claim 17, wherein said buffer is implemented as a dedicated memory.

19. Apparatus as claimed in claim 16, wherein said buffer occupancy tracking circuitry is configured to store a current buffer utilisation value providing an indication of a current buffer utilisation at a current processing cycle, said stored current buffer utilisation value being readable by said device external to said integrated circuit.

20. Apparatus as claimed in claim 1, wherein said data stream receptor is one of a memory, a peripheral, a trace port and a frame buffer.

21. Method for processing data comprising the steps of:
generating a data stream;
receiving said data stream at a buffer and buffering data contained in said data stream;
receiving at a data stream receptor data of said data stream from said buffer;
monitoring an occupancy level of said buffer resulting from transfer of said data stream between said data stream generator and said data stream receptor and for maintaining a highest buffer utilisation value providing an indication of a highest buffer occupation level for a given time period during utilisation of said buffer,
wherein in response to a current buffer utilisation value during said given time period is found to exceed the highest buffer utilisation value, then updating the highest buffer utilisation value to be equal to the current utilisation value.

22. Apparatus for processing data comprising:
means for generating a data stream;
means for receiving said data stream at a buffer and buffering data contained in said data stream;
further means for receiving said data stream on output from said buffer;
means for monitoring an occupancy level of said buffer resulting from transfer of said data stream between said means for generating and said further means for receiving and for maintaining a highest buffer utilisation value providing an indication of a highest buffer occupation level for a given time period during utilisation of said buffer,
wherein in response to a current buffer utilisation value during said given time period is found to exceed the highest buffer utilisation value, then the means for monitoring an occupancy level of said buffer is configured to update the highest buffer utilisation value to be equal to the current utilisation value.

* * * * *